United States Patent

[15] 3,648,649
[45] Mar. 14, 1972

[54] BAKER'S SPRINKLING APPARATUS
[72] Inventor: Arthur Wasserman, Minneapolis, Minn.
[73] Assignee: Burd, Braddock & Bartz, Minneapolis, Minn. a part interest to each
[22] Filed: Dec. 22, 1969
[21] Appl. No.: 886,868

[52] U.S. Cl..............................118/31, 209/236, 209/343, 209/338, 425/173, 425/197, 425/215, 425/110
[51] Int. Cl. .....................A21c 9/04, B07b 1/08, B07b 1/32
[58] Field of Search....................107/43, 1 B, 4 F; 209/235, 209/236, 342, 343, 337–338, 370–373; 222/276, 287, 565

[56] References Cited

UNITED STATES PATENTS

| 573,272 | 12/1896 | Johnson | 209/337 |
| 942,903 | 12/1909 | Hoop | 209/338 |
| 1,034,302 | 7/1912 | Rice | 209/343 |
| 2,153,030 | 4/1939 | Venable | 222/287 |
| 2,732,057 | 1/1956 | Temple | 107/7 B |
| 3,272,154 | 9/1966 | Kratz | 107/43 |
| 3,313,414 | 4/1967 | Cox | 209/344 |

FOREIGN PATENTS OR APPLICATIONS

| 429,192 | 5/1935 | Great Britain | 107/1 B |

Primary Examiner—Frank L. Abbott
Assistant Examiner—Leslie A. Braun
Attorney—Burd, Braddock & Bartz

[57] ABSTRACT

A baker's sprinkling apparatus for sprinkling peel boards and other baking surfaces with corn meal and for sprinkling bakery products such as rolls and buns with particulate toppings such as poppy seeds and sesame seeds. The sprinkler has a main frame with parallel horizontal slide rails. Slidably mounted upon the slide rails is a container with a screen mesh bottom containing the material to be sprinkled. The surface upon which the material is to be sprinkled rests upon transverse rods below the slide rails. Stop means at either end of the slide rails stop sliding movement of the container and impart a jar to it causing a predetermined amount of the material to be sprinkled from the mesh bottom and collect upon the surface below. Catch means below the transverse rods catch the excess material.

3 Claims, 4 Drawing Figures

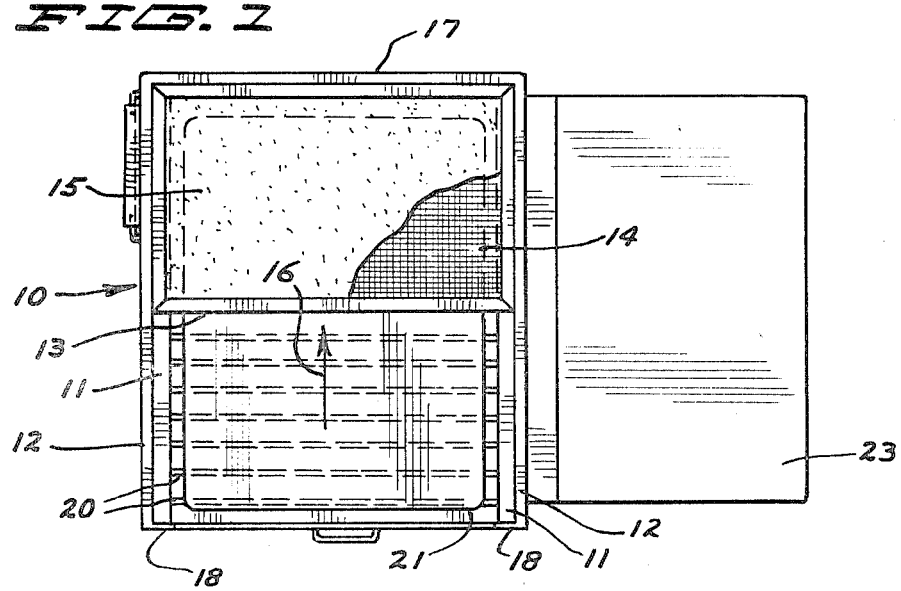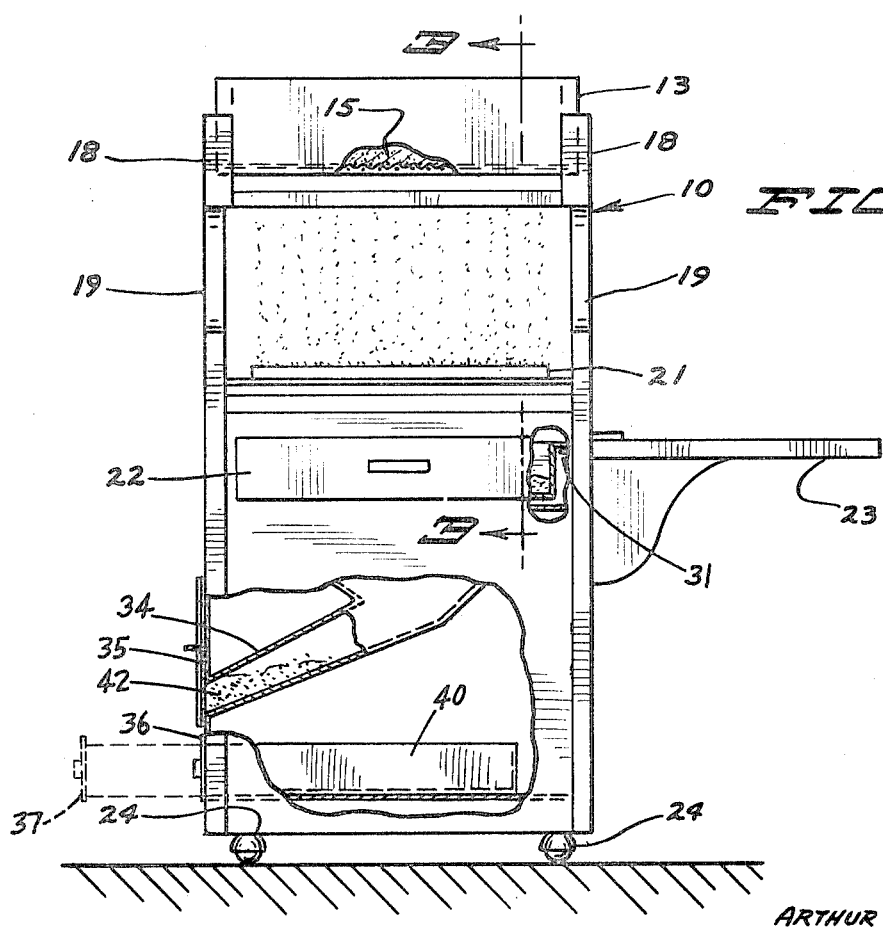

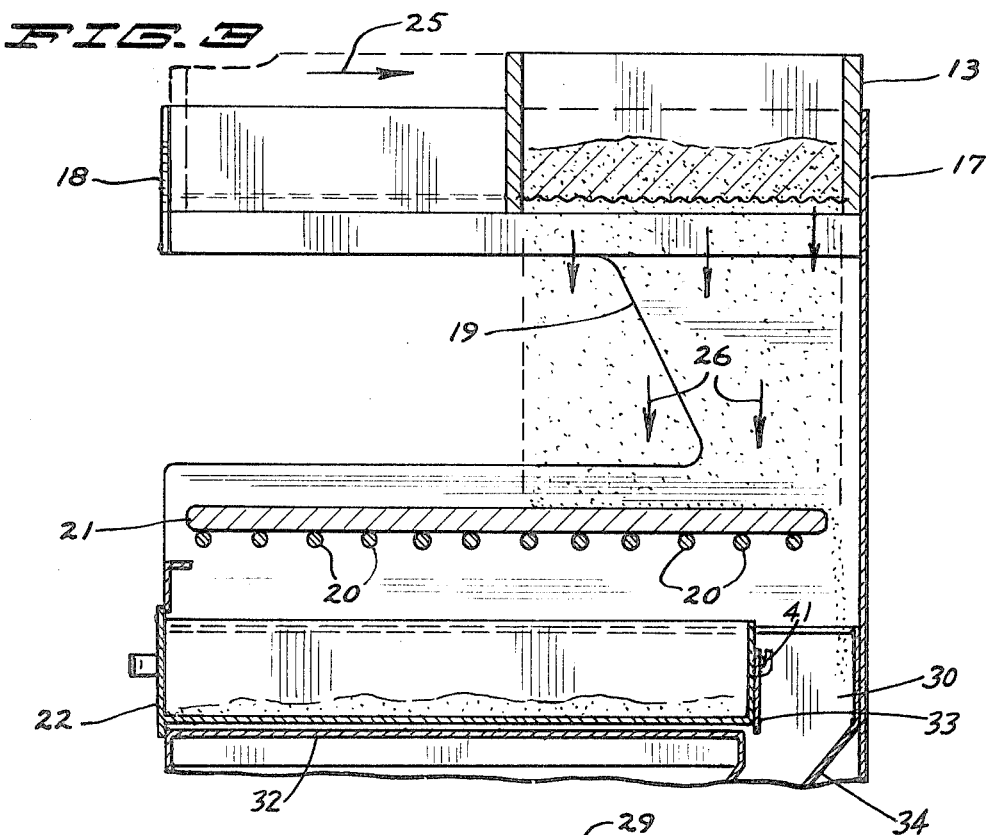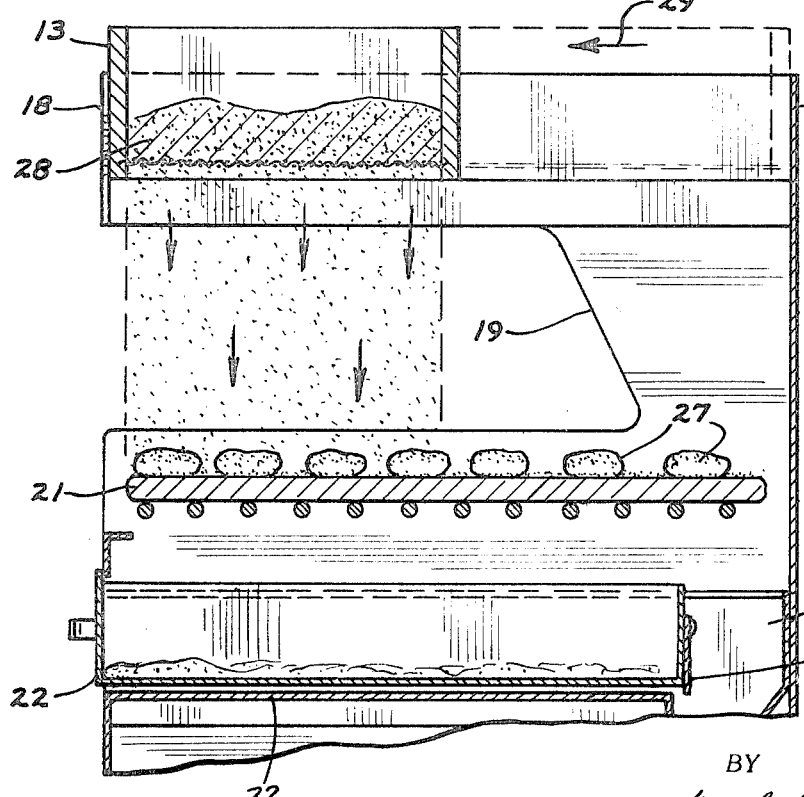

3,648,649

BAKER'S SPRINKLING APPARATUS

BACKGROUND OF THE INVENTION

In the bakery trade rolls, buns, bread, and the like, are commonly baked on peel boards and other suitable baking surfaces. In order to prevent sticking of the bakery product to the baking surface and to facilitate removal, it is desirable to coat such surfaces with corn meal. Typically at the beginning of a baking day, numerous peel boards are prepared by coating them with corn meal and are thereby maintained in a state of readiness for the day's work. In larger commercial bakeries, this is done by complex electrically operated machines as, for example, the Ra Dec peel board duster. Such machines are not only expensive in initial price and upkeep, but are wasteful of corn meal. In smaller bakeries, such machines are economically unfeasible, so the peel boards generally are coated manually. Corn meal is sprinkled on the peel board, then rubbed around by the hand. The manual process is slow and tedious, and a uniform coating is not achieved. Slivers and splinters for the peel board frequently lodge in the hand.

Automatic electric machines are also employed in larger bakeries for the spreading of particulate toppings such as poppy seeds and sesame seeds on bakery products. Again, the economic unfeasibility of such machines in smaller bakeries requires that the operation be performed manually.

Flour sifters and similar discrete material dispensing devices in the prior art commonly utilize a screen mesh to sift and sprinkle the material. The screen mesh is vibrated by a reciprocating eccentric shaft, thereby imparting to it continuous agitation causing the material to be continuously sifted through the mesh. See U.S. Pats. Nos. 1,034,302; 2,153,030; and 3,313,414. Mechanisms required to achieve such continuous agitation are bulky, space consuming, and needlessly complex for applications where continuous agitation is unnecessary. In U.S. Pat. No. 1,034,302, flour is sifted through a box with a screen mesh bottom fitted on slide rails by causing a collision between the box and a stop at one end of the slide rails. The collision jars the box causing flour contained within to be sifted through the screen mesh bottom. The area which may be sprinkled is limited to the projected area defined by the perimeter of the screen mesh, no more and no less. The versatility of such apparatus is thus limited, and often much of the discrete material being sprinkled is wasted.

SUMMARY OF THE INVENTION

The invention relates to an improved baker's sprinkling apparatus for sprinkling a uniform layer of corn meal on peel boards and other baking surfaces, and for sprinkling particulate toppings such as poppy seeds and sesame seeds on bakery products. The sprinkler of the invention provides efficiency and simplicity over sprinkling devices known in the prior art. The sprinkler comprises a main frame having two horizontal parallel slide rails. A mesh bottom container is slidably mounted on the slide rails and contains the discrete material to be sprinkled. At each end of the slide rails stop means are provided which stop sliding movement of the container and serve also to impart to it a jar of sufficient force to cause dispersion through the mesh bottom of the proper amount of material. The container then is made to collide with stop means at one end of the slide rails, causing dispersion of material over only that projected area then defined by the perimeter of the screen mesh. The motion of the container is then reversed, and it is slid along the slide rails and made to collide with the stop means at the opposite end causing dispersion of material over an area adjacent and equal to the first. The force of the collision regulates the amount of material dispersed.

The object to be sprinkled rests on transverse rods beneath the slide rails. This object may be, of example, either a peel board to be coated with corn meal or rolls or buns placed on a peel board to be topped with poppy seeds or sesame seeds. Disposed beneath the transverse rods is a catch means adapted to catch and preserve for reuse excess sprinkled material, thereby minimizing waste.

An object of the invention is to provide an efficient low-cost baker's sprinkler. Another object of the invention is to provide a manually operated baker's sprinkler adaptable to sprinkle over either a small area or over a large area equal to twice the small area. A further object is to provide a baker's sprinkler for sprinkling a variety of discrete materials over any surface with no waste of discrete material.

IN THE DRAWINGS

FIG. 1 is a top view of the apparatus of the invention with a section cut away to further illustrate the apparatus;

FIG. 2 is a front elevational view of the apparatus of the invention with sections cut away to further illustrate the apparatus;

FIG. 3 is a side sectional view of the apparatus of the invention taken along the section 3—3 in FIG. 2 and showing a peel board being sprinkled; and FIG. 4 is a side sectional view as in FIG. 3 but showing another use of the apparatus of the invention.

DESCRIPTION OF THE PREFERRED EMBODIMENTS

Referring to the drawings, there is shown in FIGS. 1 through 3 a preferred embodiment of the invention. A main frame 10 has horizontal parallel longitudinal slide rails 11 with side guides 12. A rectangular container 13 having a rectangular mesh bottom 14 is slidably mounted on the slide rails 11 and laterally confined by the side guides 12. A discrete material 15, such as corn meal, is contained within the container 13. The specific porosity of the mesh bottom 14 will vary according to the granular size of the discrete material 15, and will be of such a porosity that normally the discrete material 15 is contained by the mesh bottom 14 but upon a jarring of the container 13 a desired amount sifts through the mesh bottom 14. The slide rails 11 are of a suitable length to just allow a slidable distance of the container 13 in the direction of the arrow 16 equal to twice the longitudinal dimension of the mesh bottom 14.

At the rear end of the slide rails 11 is a rear stop 17 shown comprised of the top edge of the rear wall of the main frame 10. The rear stop 17 is positioned to stop the rearward movement of the container 13 along the slide rails 11 and impart a jar to it. At the forward end of the slide rails 11 are forward stop means 18 shown to be inturned lips of the side guides 12 disposed to stop forward movement of the container 13 along the slide rails 11 and impart a jar to it.

As best seen in FIGS. 2 and 3, upright support members 19 integral with the main frame 10 support and position the slide rails 11 directly above a plurality of transverse rods 20 secured at either end to the main frame 10. A peel board 21 rests upon the transverse rods 20 in a position to receive material dispersed from the mesh bottom 14. The transverse rods 20 are adapted to slidably accommodate the peel board 21 or other baking objects.

Located in the main frame 10 beneath the transverse rods 20 are catch means to catch excess discrete material falling from the mesh bottom 14. In the preferred embodiment illustrated, catch means include a rectangular drawer 22 and a rear collector 30, the drawer 22 being in adjacent relationship to and forward of the rear collector 30. Together the drawer 22 and the rear collector 30 define a horizontal surface area positioned to catch all excess discrete material falling from the mesh bottom 14. The drawer 22 is removably mounted in the main frame 10 in a position to catch the forward portion of the excess discrete material. The drawer 22 is adapted to easily slide in and out of the main frame, for example, as being suspension mounted as shown at 31. Mounted in the main frame 10 directly beneath the drawer 22 is a horizontal shelf 32. The rear edge of the shelf 32 terminates at the forward edge of the rear collector 30. Extending laterally across the rear vertical wall of the drawer 22 is a flap 33 attached at the top by any usual or preferred pivot means 41 to allow a rotation of the flap at the bottom in a direction away from the rear vertical wall of the drawer 22. The flap 33 is of a vertical dimension sufficient to contact the shelf 32 when the rear vertical wall of the drawer 22 is disposed over the shelf 32. The collector 30 joins at the bottom a chute 34 in such a manner that all material entering the collector 30 descends into the chute 34. The chute 34 is generally vertically inclined and converges downwardly, terminating at its lower end at one of the side walls of the main frame 10. An opening 42 in the side wall of the main frame 10 at the area of termination of the lower end of the chute 34 provides an exit from the main frame for material dispensed through the chute. A transparent vertically slidable door 35 closes the opening in the main frame and prevents unwanted dispersion of the material through the opening. The door 35 is adaptable to be slid upward thereby uncovering the opening the main frame so that material will be dispensed from the chute through the opening. A second drawer 40 is slidably and removably mounted in the main frame 10, said drawer being illustrated in a closed position at 36 and in an open position at 37. While in the open position 37, the second drawer is in a position beneath the opening 42 in the main frame to catch material dispensed through the chute when the door 35 is in an open position.

A foldable horizontal shelf 23 is mounted for the baker's convenience on one side of the main frame 10 and may be used to hold peel boards or other bakery objects to be sprinkled. At the bottom of the main frame 10 on each corner are provided roller casters 24 in order that the sprinkler may be easily moved from one position to another on the floor.

In the use of the sprinkler of the invention, as shown in FIG. 3, a peel board 21 (or other object having a surface to be sprinkled in preparation for baking) is slid on the transverse rods 20 to a position beneath the area defined by the parallel slide rails 11. The container 13 contains the discrete material to be sprinkled on the peel board, such as corn meal. The baker then manually slides the container 13 along the slide rails 11 in a rearward direction indicated by the arrow 25 until a collision is effected with the rear stop 17. The collision imparts a jar to the container which causes a predetermined amount of material to sift through the mesh bottom 14. By regulating the force of the collision, the baker is able to regulate the amount of material sifted through the screen mesh bottom. The material descends, as shown by the arrows 26, and collects uniformly upon the rear one-half of the peel board. The baker then slides the container 13 in a forward direction opposite to the arrow 25 along the slide rails 11 until a second collision is effected with the front stop means 18. The second collision imparts a jar to the container which causes a predetermined amount of material to shift through the mesh bottom 14 and descend the collect uniformly on the remaining one-half of the peel board 21. The entire peel board is now uniformly coated with the discrete material. The peel board is removed by sliding it off the rods 20 and another is put in its place and the operation is repeated.

Excess material not intercepted by the peel board continues to descend and is caught in the catch means beneath the transverse rods. The forward portion of the excess material is caught in the drawer 22. The remaining portion of the excess material descends into the rear collector 30 where it is directed into the chute 34. The door 35 is in a normally closed position, causing the material to collect in the chute. When the baker sees either through the transparent door 35 or through the collector that the chute has filled with excess material to a desired amount, he moves the second drawer from a closed position 36 to an open position 37. The baker then opens the sliding door 35, thereby allowing all of the material collected in the chute to descend and collect in the second drawer. The baker removes the second drawer and empties the contents into the rectangular container 13. From time to time the drawer 22 is removed and the material contained therein emptied back into the container 13. If the baker allows an abundance of material to collect in the drawer 22, upon removal of the drawer some of the material may accidentally fall out and be deposited on the shelf 32. However, when the baker replaces the drawer 22, the material collected on the shelf 32 will be swept rearward by the flap 33 into the rear collector 30, thereby eliminating all waste.

A second use of the apparatus of the invention is shown in FIG. 4. Rolls 27, or other bakery items such as buns or bread, are placed on a peel board 21 which is slid on the transverse rod 20 to a position beneath the area defined by the parallel slide rails 11. The container 13 having a mesh bottom 14 of a suitable porosity contains a discrete particulate topping material 28 such as sesame seeds or poppy seeds according to the baker's preference. The apparatus is then operated in the same fashion as shown in FIG. 3, first effecting a collision between the container and the rear stop 17, for example, and then sliding the container in the direction of the arrow 29 to effect a collision with the forward stop means. A uniform layer of the particulate topping 28 is thus sprinkled on the rolls 27. Should the baker desire to sprinkle the topping on only one-half of the rolls and leave the remaining rolls plain, he may do so by effecting a collision between the container 13 and the stop means at only one end of the slide rails 11.

At any time the baker wishes to sprinkle a different material, he removes the container 13 and replaces it with another containing the new material to be sprinkled. He next removes the drawer 22, empties it in a place to preserve the material for use at a later date, and replaces it. Excess material deposited on the shelf 32 is pushed by the flap 33 into the collector 30 upon the replacement of the drawer 22. Then the baker opens the second drawer 40, allows the material from the chute 34 to descent into the second drawer, removes and empties it, and replaces it.

The lateral dimension of the mesh bottom 14 of the container 13 may be varied, if desired, according to the lateral dimension of the surface to be sprinkled.

While two uses of the invention have been shown and illustrated, it is understood that by its versatility the invention is adaptable to numerous other uses, for example the spreading of grated cheese on pizza pie, or the spreading of sugar on doughnuts.

What is claimed is:

1. A baker's sprinkler suitable for sprinkling a discrete material upon bakery objects, including a main frame, horizontal longitudinal parallel slide rails integral with the main frame, a rectangular container for the containing of the discrete material and adapted to slide longitudinally on the slide rails, a screen mesh comprising the bottom of the rectangular container, said mesh being of size and shape to retain substantially all of the discrete material when said container is at rest and to pass a portion of said material when said container is jarred, rear stop means secured at one end of the slide rails to stop the sliding of the container and impart a jar to it, forward stop means secured at the other end of the slide rails to stop the sliding of the container and impart a jar to it, the distance between the rear stop means and the forward stop means being greater than the longitudinal dimension of the rectangular container, a plurality of spaced apart rods transversely mounted in the main frame disposed beneath the slide rails in a horizontal plane spanning a surface defined by a projection of the area bounded by the slide rails and between the forward stop means and the rear stop means, said rods being in position to slidably support a bakery object to receive said discrete material, catch means mounted in the main frame beneath the rods in position to catch excess sprinkled discrete material from said container which has fallen past said rods, said catch means including a first drawer slidably and removably mounted in the main frame, a collector, the first drawer being in adjacent relationship to and located forward of the collector, the first drawer and the collector together defining a horizontal surface area positioned to catch all excess discrete material falling from the mesh bottom, a vertically inclined chute connected at the upper end to a lower portion of the collector in a manner that material entering the collector is directed into the chute, a second drawer slidably and removably mounted in the main frame and having an open position and a closed position, said second drawer when open being in a position to accept material dispensed from the chute, and means to control the flow of material from the chute.

2. A baker's sprinkler according to claim 1 wherein: the longitudinal distance between the rear stop means and the forward stop means is equal to twice the longitudinal dimension of the screen mesh bottom.

3. A baker's sprinkler according to claim 1 including: a flap extending laterally across the rear vertical wall of the first drawer pivotally attached to the first drawer to allow a rotation of said flap at the bottom in a direction away from the rear vertical wall of the first drawer.

* * * * *